United States Patent
Nicholas et al.

(10) Patent No.: US 6,782,066 B1
(45) Date of Patent: Aug. 24, 2004

(54) METHOD AND SYSTEM FOR DETECTING FRAME SLIPS IN A DIGITAL COMMUNICATIONS CHANNEL

(75) Inventors: Michael G. Nicholas, Wheeling, IL (US); Vladimir G. Parizhsky, New York, NY (US)

(73) Assignee: 3Com Corporation, Marlborough, MA (US)

(*) Notice: Subject to any disclaimer, the term of this patent is extended or adjusted under 35 U.S.C. 154(b) by 0 days.

(21) Appl. No.: 09/231,034

(22) Filed: Jan. 14, 1999

Related U.S. Application Data

(60) Provisional application No. 60/089,446, filed on Jun. 16, 1998.

(51) Int. Cl.$^7$ ................................................. H04L 7/00
(52) U.S. Cl. ........................ 375/368; 375/357; 370/510; 370/523
(58) Field of Search ................................. 375/354, 357, 375/363, 365, 368; 370/503, 510, 523; 704/222

(56) References Cited

U.S. PATENT DOCUMENTS

| | | | | |
|---|---|---|---|---|
| 4,764,921 A | * | 8/1988 | Graves et al. | 370/510 |
| 5,765,128 A | * | 6/1998 | Tsuboi et al. | 704/222 |
| 6,023,493 A | * | 2/2000 | Olafsson | 375/354 |
| 6,104,730 A | * | 8/2000 | Marks | 370/523 |
| 6,185,250 B1 | * | 2/2001 | Wang et al. | 375/222 |

* cited by examiner

*Primary Examiner*—Chieh M. Fan
(74) *Attorney, Agent, or Firm*—McDonnell Boehnen Hulbert & Berghoff

(57) ABSTRACT

A method and system for detecting frame slips due to loss of synchronization in a digital communication channel is described. In an illustrative embodiment, a synchronization bit pattern is periodically embedded in the digital data stream. In a described embodiment, the sign bits of the octets of every N frame of data is robbed to form a periodic control channel carrying the synchronization bit pattern. The control channel can be monitored at the appropriate intervals to detect the appropriate synchronization bit pattern. Failure to detect the synchronization bit pattern at the appropriate interval indicates a loss of synchronization such as a frame slip.

31 Claims, 3 Drawing Sheets

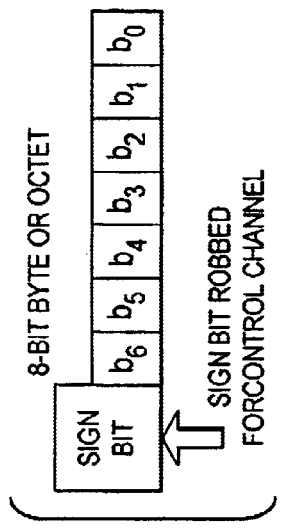
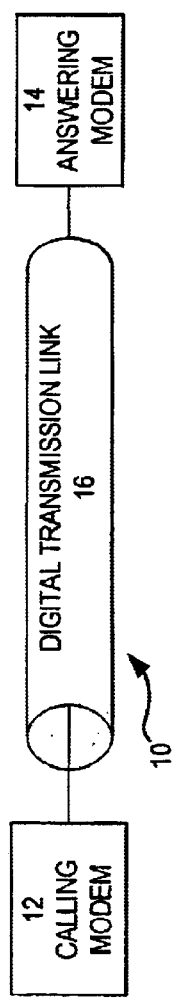
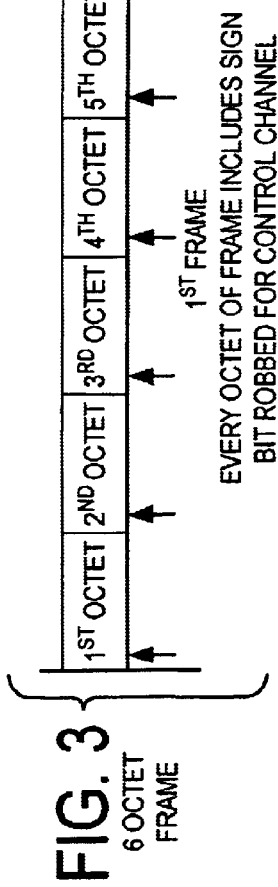
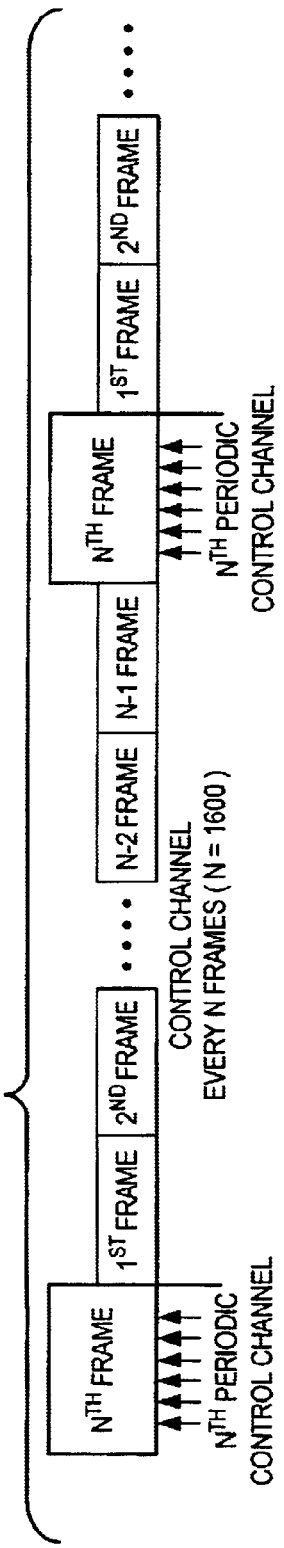

METHOD AND SYSTEM FOR DETECTING FRAME SLIPS IN A DIGITAL COMMUNICATIONS CHANNEL

CROSS-REFERENCE TO RELATED APPLICATION

This application claims priority to provisional patent application 60/089,446 filed Jun. 16, 1998, entitled "Method and System for Detecting Frame Slips in a Digital Communication Channel"

FIELD OF INVENTION

This invention generally relates to techniques for data communication over an all-digital communication channel. More specifically, it relates to a method and system for detecting frame slips in a digital end-to-end communication channel.

BACKGROUND OF THE INVENTION

Timing synchronization is critical for digital data transmission. For example, a typical T1 digital communication system time-division multiplexes 24 digitally encoded DS-0 voice channels to form a DS-1 digital signal. Each of the DS-0 communication channels carries an 8-bit code word formed by sampling a signal at an 8000 times per second rate (8 KHz), resulting in a 64 Kbps communication channel. Together, the 24 time-division multiplexed ("TDM") 64 Kbps communication channels form a 1.544 Mbps DS-1 signal. A DS-1 frame thus includes 24 multiplexed or interleaved 8-bit code words or octets. In addition, a framing bit is added to form a 193-bit (24×8+1) frame. The DS-1 frame of 193 bits repeats 8000 times per second to form the T1 1.544 Mbps line rate (193×8000=1,544,000).

To properly receive the DS-1 frame, a receiver must be precisely synchronized with the transmitter to detect the beginning and end of the DS-1 frame, and allow identification of the 24 individual TDM channels. Because the DS-1 frame is only 125 microseconds in duration, a loss of synchronization will cause an alignment slip that may result in data being lost. To detect the frame synchronization, the framing bit may be alternated between 1 and 0 to establish an identifiable frame synchronization bit pattern. The alternating 1, 0, 1, 0, 1, 0 framing sequence is a uniquely identifiable framing bit pattern that does not appear in ordinary voice traffic.

Loss of synchronization typically occurs between a transmitter and a receiver using clock frequency sources that cannot always be precisely synchronized. Despite attempts to synchronize the clocks of the communicating devices, the clock rates between two devices will inevitably not be exactly the same. Communication devices often use elastic stores to reconcile differences in clock rates from different sources. Eventually, however, the offset between the clocks of the devices may build up or accumulate until the elastic stores can no longer reconcile the differences. One problem caused by a loss of synchronization is a periodic frame slip, where a complete frame of data is either repeated or lost depending on the relative skew of the transmitting and receiving clocks. The elastic buffers gradually fill (or empty) until it either overflows (or underflows) and a slip occurs. Such frame slips may be difficult to detect and correct because there is no mechanism to detect a repetition or loss of an entire frame of data, especially at the DS-0 signal level. Because such losses in synchronization may occur, techniques for detecting and correcting such communication errors are necessary.

Certain other digital interface protocols, such as the Integrated Services Digital Network ("ISDN) protocol, provide additional overhead bits for synchronizing data transmission. ISDN uses High Data Link Control ("HDLC") framing which provides a specific data pattern or "flag" to indicate the end of data blocks and detect any frame slips. To ensure the data pattern uniquely identifies the end of a data block, the transmitters are prohibited from transmitting the specific data pattern as part of a data sequence by using an appropriate bit insertion algorithm. HDLC framing, however, requires headers, sequence numbers and error correction overhead bits that consume communication data bandwidth.

When transmitting digital data at high data rates over a digital communication channel through the Public or General Switched Telephone Network ("GSTN"), such as with the proposed V.90 all-digital mode (56 Kbps) or V.91, additional overhead bits may not be available for frame synchronization. In the V.90 all-digital mode, two communication devices are communicating through the PSTN via an all-digital connection using baseband PCM codes. As part of a communication training sequence, the two devices determine exactly which PCM codes can be used for data transfer, and which cannot be used due to impairments in the digital network such as digital pads, robbed bits, sign bit inversion, zero byte suppression, A-Law to u-law transcoding, etc. Once these channel impairments are determined and the appropriate PCM codes are selected, the primary event in the network that will cause data communication errors is frame slip due to loss of synchronization. In achieving the highest bit rates, however, all available bits are used for data transfer, leaving no overhead bits to detect frame synchronization. Needed is a mechanism for providing synchronization and detecting loss of fame during high-speed data transmission over all-digital communication lines through the GSTN that consumes a minimum amount of available communication bandwidth.

SUMMARY OF THE INVENTION

In accordance with an illustrative embodiment of the present invention, the problems associated with the synchronization of frames of data and detecting loss of frame synchronization in a digital communication channel are addressed. The present embodiment provides a method and device for detecting frame or digital slips due to loss of synchronization in a digital communication channel.

In an illustrative embodiment according to an aspect of the invention, a method of transmitting data to detect frame slips in a digital communication channel is described. The method includes stealing a number of data bits in a transmitted digital signal for use as a control channel to monitor synchronization of the communication channel. For example, the sign bits of each of the octets of a particular data frame are robbed and used as a control channel for timing synchronization of the transmitted data. In an illustrative example, the particular data frame may be selected periodically such as 1 of N number of data frames, where N may be equal to every 1600 frames. There are 6 octets in a data frame and the sign bits of each octet of the particular frame can be set to a unique synchronization bit pattern that is not likely to occur in transmitted data.

To detect a frame slip, the receiver monitors the control channel for the unique bit pattern. If the unique bit pattern is not detected in the expected periodic frame, a synchronization problem has occurred between the transmitter and the receiver and it can be assumed that a frame slip has occurred. For example, if a frame slip has occurred, the control channel bits will be detected out of their normally expected sequence or positions, such as the synchronization bit pattern being detected one octet too early or late. In either case, data bits will be detected in bit positions where the control channel frame should be and the unique bit pattern of the synchronization bit pattern of the control channel will not be matched, thus indicating a frame slip. The synchronization bit pattern should therefore be chosen such that it can be detected and distinguished from a data bit pattern after a frame slip. In a particular example, all logic 1s or a pair of logic 0's framing a series of logic 1s, 01111110 can be utilized.

In other embodiments, the control channel may also be used to carry other information such as a clear down of the call or a request to retrain. The control channel may also be used to carry other types of data.

In an embodiment of the invention, a transmitter can be embodied as including a counter maintaining a count of frames of data, a buffer for storing a bit pattern, and a multiplexer for inserting the bit pattern.

According to another aspect of the invention, executable software code and a computer system with memory is used to implement the described embodiment. Alternatively, dedicated hardware, discrete logic, programmable logic devices ("PLD"), application specific integrated circuits ("ASIC") may be used to implement the described embodiment. In an illustrative embodiment, a counter, a buffer or register for storing control bits, and a comparator for comparing bit patterns to the synchronization bit pattern are used to monitor the synchronization of a digital signal.

In another embodiment of the invention, the described method includes the steps of robbing bits to form a control channel embedded in the digital data stream, monitoring the control channel embedded within the digital data stream, and comparing the bit pattern of the control channel to the synchronization bit pattern. The failure to match the bit pattern to the synchronization bit pattern is assumed to indicate a loss of synchronization and a potential frame slip.

Using the described embodiments, frame slips in a high-speed digital communication link can be detected. For example, the described embodiment allows communication devices to verify proper synchronization and recognize synchronization errors indicating frame slips resulting in a loss of data. The periodically embedded control channel provides a synchronization bit pattern that utilizes a minimum of overhead bits to maintain the highest possible data communication rates. The control channel as described herein requires less overhead and consumes less bandwidth than other framing methods.

The foregoing and other features and advantages of an illustrative embodiment of the present invention will be more readily apparent from the following detailed description, which proceeds with references to the accompanying drawings.

BRIEF DESCRIPTION OF THE DRAWINGS

FIG. 1 shows a system with communication devices capable of utilizing an embodiment of the present invention;

FIGS. 2, 3, and 4 are diagrams showing a hierarchy of digital signals streams which are transmitted in the illustrated embodiment depicted in FIG. 1;

DETAILED DESCRIPTION OF AN ILLUSTRATIVE EMBODIMENT

Figure 5B:
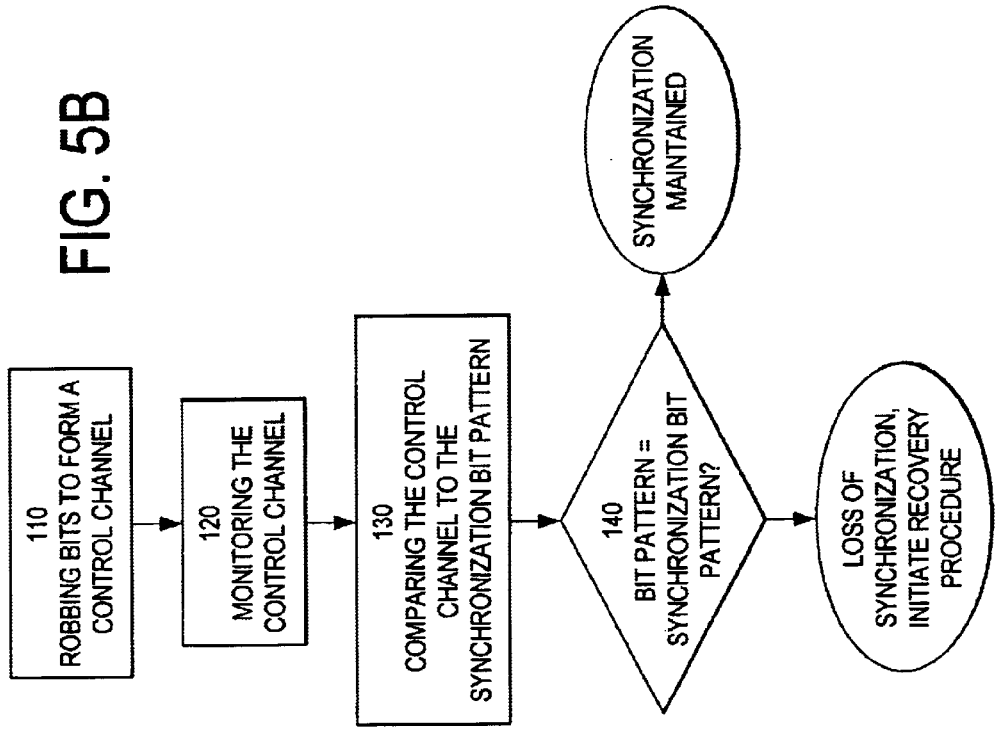
FIGS. 5A and 5B show flow charts of illustrative methods according to an aspect of the invention.

FIG. 1 is a block diagram of a system 10 utilizing an illustrative embodiment of the invention. The communication devices 12, 14 are preferably high-speed modems but may be any communication device capable of communicating digital information through the digital communication channel 16. In this illustrative embodiment, the communication devices 12, 14 may be generally referred to as modems, preferably capable of both analog and digital communication modes using a modulated carrier signal or preferably a baseband PCM system. The first or calling modem 12 is connected to communicate with a second or answering modem 14 through the digital communication channel 16. In a digital communication mode that can be used to communicate over an end-to-end digital connection, the modems 12, 14 may implement a digital V.90 "All Digital Mode" as defined and currently being proposed by the ITU-T communication standards committee. The V.90 "All Digital Mode" used in conjunction with the current embodiment can provide all-digital connections allowing high-speed PCM communication in both directions.

The communication network 10 may take many forms, but will generally be referred to herein as the Public Switched Telephone Network ("PSTN") or General Switched Telephone Network ("GSTN"). The GSTN is any of the networks, usually carrying telephony voice and modulated digital computer data, provided by the Regional Bell Operating Companies, AT&T, GTE, and other communication networks comprising multiple switching offices. The communication network 10 may also include a computer data network such as the public Internet, a token ring or packet network, Ethernet, asynchronous transfer mode ("ATM"), Frame Relay, TCP/IP, SONET or any private communication network, or intranet. Preferably the calling modem 12 is connected to the network with a digital connection 16 such as provided by an integrated services digital network ("ISDN") Primary Rate Interface ("PRI") or Basic Rate Interface ("BRI") which may be carried by high capacity time-division multiplexed connections such as a T1 or E1 connections. The network 10 typically forms a circuit-switched transmission channel that allows the communication between the modems 12, 14. The transmission or communication channel can take various forms and be made of a plurality of connection links across the communication network 16. Ideally, a digital communication mode using a typical all-digital network connection allows data transmission at up to 64 Kbps.

In an illustrative embodiment, the devices 12, 14 may utilize the ITU-T defined V.8 or V.8 bis protocols for negotiating the ITU-T V.34 communication protocol which is known to those skilled in the art. Upon the calling communication device 12 initiating and establishing a communication channel through the communication network 16 to the answering communication device 14, the answering device 14 responds by transmitting a modified answer tone or ANSam. A training or negotiation process between the devices 12, 14 is then initiated to determine the characteristics and capabilities of the transmission line and agree on a set of connection features, modulation, and options between the devices. An example, of a line probing call negotiation sequence suitable for used with the present invention is described in U.S. patent application Ser. No. 08/816,699, entitled "System and Method for Determining End-to-End Characteristics of Data Communication Channel" which is hereby incorporated by reference. A method of determining an all-digital connection is described in U.S. patent application Ser. No. 09/087,153, entitled "Method and System For Detecting Analog and ADPCM Links In a Communication Channel" which is hereby incorporated by reference. Preferably, the line training results in the determination that the network provides an all-digital communication channel suitable for using a digital communication protocol such as the ITU-T proposed V.90 All-Digital Mode.

Referring to FIG. 2, in the illustrative embodiment digital data is transmitted in 8-bit octets according to G.711 PCM μ-law coding in North America and A-law coding in Europe, known to those skilled in the art. Theoretically, there are 256 points represented by the 256 possible μ-law codewords or octets. The format of the μ-law codewords is shown in FIG. 2, where the most significant bit $b_7$ is a sign bit, the three bits $b_6$–$b_4$ represent the linear segment, and the four bits, $b_0$–$b_3$ indicate the step along the particular linear segment. A μ-law or A-law codeword may be referred to herein as a PCM codeword.

Referring to FIG. 3, in the illustrative embodiment, x number of data octets are grouped together to form a frame of data. In this example, x is equal to 6, thus 6 octets form a frame of data. To form a control channel for timing synchronization of transmitted digital data, each of the sign bits (FIG. 2) of the six octets in a periodic frame of data are used to carry a uniquely identifiable synchronization bit pattern rather than carrying transmitted data. Preferably, the sign bits or most significant bits $b_7$ of the six octets of every Nth frame of data may be set to a unique synchronization bit pattern that can be used to determine when a frame slip has occurred. In this example, N is equal to 1600 such that every $1600^{th}$ frame of data includes 6 octets of data having their sign bits robbed to form a control channel carrying the synchronization bit pattern. Periodically using the sign bits or most significant bits $b_7$ to form an embedded control channel allows the digital signal to be handled by digital pads and robbed bit signaling without affecting the control channel. Of course other bits as well as other values of x and N can also be periodically used to form an embedded control channel.

To detect a frame slip, the transmitter sends a unique synchronization bit pattern within the control channel as described above. The receiver monitors the control channel for the unique bit pattern. If the unique bit pattern is not detected in the expected periodic frame, a synchronization problem has occurred between the transmitter and the receiver and it can be assumed that a frame slip has occurred. For example, if a frame slip has occurred, the control channel bits will be detected out of their normally expected sequence or positions, such as the synchronization bit pattern being detected one octet too early or late. In either case, data bits will be detected in bit positions where the control channel frame should be and the unique bit pattern of the synchronization bit pattern of the control channel will not be matched, thus indicating a frame slip. The synchronization bit pattern should therefore be chosen such that it can be detected and distinguished from a data bit pattern after a frame slip. For example, certain bit patterns are more suitable for detecting frame slips by avoiding falsely detecting a good synchronization condition when a frame slip has actually occurred. Generally, the longer the synchronization bit pattern the more unique the bit pattern is and the less likely it is to improperly match a data pattern when a frame slip has actually occurred. Thus, longer bit patterns such as 011111111110 and 0111011111111010 are more desirable. The sign bits of the x octets may also be set to all logic 1s, a bit pattern that does not regularly occur in a digital signal.

In addition, other bit patterns may also be used to detect a loss of synchronization. To provide for earlier detection of a frame slip, a bit pattern such as 011110 allows detection of a frame slip on the first frame. Of course, other synchronization bit patterns can also be used.

Referring to FIG. 4, the particular frame of data in which the sign bits are robbed to form an embedded control channel for synchronization may be selected by those of skill in the art. In the present embodiment, the particular frame is preferably selected periodically as every Nth frame, where x octets of data form a frame. In the illustrative embodiment, x is equal to 6 and N is equal to every $1600^{th}$ frame. The 6 sign bits of the octets that form the 1600th frame is used as a periodically embedded control channel followed by the 1599 frames which carry exclusively digital data. The $1600^{th}$ frame again has the sign bits of each of the 6 data octets robbed to form the periodically embedded control channel. A data rate of 8000 octets/second and with 6 octets in a frame equals a frame rate of 1,333.33 frames/second. Using the six sign bits of one frame of data out of every 1600 frames as a periodically embedded control channel equals robbing 5 bits per second (6 * 1,333.33/1600). Robbing five bits of data every second of data transmission at the highest data rates represents a small overhead at the high data transfer rates typically achieved by high-speed digital communication modes. In other embodiments, the control channel may utilize bits at other rates to form the control channel such as 125 bits/s of the primary channel rate or using the sign bits of every $64^{th}$ data frame.

Using the described digital signal with an embedded control channel, a receiver can monitor and identify the synchronization bit pattern of the embedded control channel to verify the synchronization of a digital signal. If the receiver fails to detect the synchronization bit pattern of the control channel at the expected intervals, a synchronization problem has occurred between the receiver and transmitter indicating a frame slip has occurred. For example, if a frame slip has occurred the synchronization bit pattern will not be detected at the proper interval, rather it will be detected too late or too early. In either case, data bits that do not equal the synchronization bit pattern will be detected. Because the data bits are scrambled to randomize the transmitted bits, 50% of the data bits will be zeroes instead of the all logic 1s of the synchronization bit pattern. If the data octet just happens to have a sign bit of logic 1, the frame slip may not be detected immediately. However, the frame slip will likely be detected on the very next control channel, which has a substantial probability of being a logic 0.

Figure 5A:
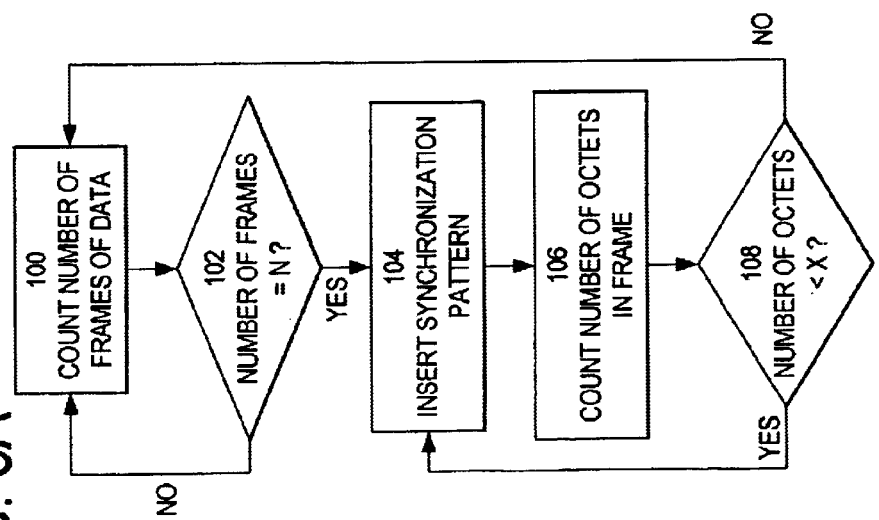

Referring to FIG. 5A, shown is an illustrative method of implementing a periodic control channel capable of detecting a loss of synchronization of a digital line indicating a possible frame slip. The illustrative method may be implemented in a communication device 12 transmitting over a digital communication link. In the illustrative method, a count of the number of frames of data to be transmitted is maintained at step 100. At step 102, when the count of frames matches a number of frames such as N, where N may equal 1600 or 64 or any other selected number of frames as previously described, the data octets of the Nth frame are used to form a control synchronization channel at step 104. At step 104 the synchronization bit pattern is inserted and each of the X octets of the Nth data frame are used to carry a portion of the desired synchronization bit pattern. As previously described herein, the sign bit of the octets of the Nth frames can be used to carry a synchronization bit pattern. At step 106, a count of the number octets in the Nth frame is maintained. At step 108, if the octet count does not exceed X, the next following octet is also used to carry a portion of the synchronization bit pattern at step 104. If the octet count is equal to or greater than X, then each of the octets of the Nth frame has been used to carry the synchronization pattern, and the count of frames reinitiates at step 100. In this manner, a periodic control channel to carry the synchronization pattern to detect frame slips can be implemented.

Referring now to FIG. 5B, shown is an illustrative method for detecting synchronization errors that may indicate a frame slip. At step 110, the present embodiment includes the steps of periodically robbing a bit of x data octets of every Nth frame for use as a control channel to monitor synchronization of the digital data stream. Every Nth frame of data has the sign bits of its x octets robbed followed by N−1 frames of data. In the preferred embodiment, N is equal to 1600 and x is equal to 6, thus 6 data octets form a frame of data. The sign bits from each of the 6 octets of every Nth frame are robbed to form a unique synchronization bit pattern as previously described. Robbing the appropriate bits may include setting the bit to logic 1s by applying a logical operation such as a logic OR operation of the sign bit of the octet with 1. In the preferred embodiment, the sign bit is robbed because it is largely unaffected by digital pads, robbed bit signaling, and other network impairments. Of course other bits may also be used to carry the control channel. Step 110 can be implemented by methods such as shown in FIG. 5A.

At step 120, the digital data stream is monitored for the synchronization control channel at the appropriate intervals to detect the synchronization of the signal. The digital data stream is monitored at the appropriate intervals as determined by the x octets and Nth data frame that form the control channel containing the synchronization bit pattern. In the preferred embodiment, for example, the sign bits of the 6 octets (x=6) of every $1600^{th}$ (n=1600) frame is counted and examined for the synchronization bit pattern. The synchronization bit pattern can take many forms, however, in the preferred embodiment all logic 1s are used.

At step 130, the detected bits at the appropriate intervals are compared to the appropriate synchronization bit pattern. In this example, the synchronization bit pattern is equal to 6 logic Is from the sign bits of the 6 octets (x=6) of every 1600th frame (n=1600). If the 6 sign bits from the octets of the appropriate frame match the synchronization bit pattern, the digital data stream is properly synchronized. If the unique synchronization bit pattern of the control channel is not detected at the expected intervals, a synchronization problem has occurred and a frame slip has occurred. Rather than detecting a bit pattern that matches the unique synchronization bit pattern at the expected interval, the transmitted data bits will be detected. Since the transmitted data bits are randomized, 50% of the bits will be zeroes instead of the all logic 1s of the synchronization bit pattern. Upon failing to match the synchronization bit pattern, a recovery procedure to recover lost data can be initiated, as well known to those skilled in the art. For example, a retraining procedure such as previously described may be initiated.

The illustrative method can be embodied as a set of computer executable software instructions running on a high-speed Central Processing Unit ("CPU") and a memory system. In the preferred embodiment, a special-purpose digital signal processor ("DSP") is utilized, but it should be understood that a general-purpose processor may also be suitable in the present embodiment. The software instructions are executed as data bits by the CPU with an addressable computer memory system. It will be appreciated that any symbolically represented operations or acts described include the manipulation of electrical signals by the CPU. The electrical system represent data bits which cause a resulting transformation or reduction of the electrical signal representation, and the maintenance of data bits at memory locations in the memory system to thereby reconfigure otherwise alter the CPU's operation, as well as other processing of signals. The memory locations where data bits are maintained also include physical locations that have particular electrical, magnetic, optical, or organic properties corresponding to the stored data bits.

The data bits may also be maintained on a computer readable medium including magnetic disks, optical disks, organic disks, and any other volatile or (e.g., Random Access memory ("RAM")) non-volatile (e.g., Read Only Memory ("ROM")) storage system readable by the CPU. The computer readable medium includes cooperating or interconnected computer readable media, which exist exclusively on a processing system or is distributed among multiple interconnected processing systems that may be local or remote to the processing system.

It should be understood that a hardware embodiment may take a variety of different forms. The hardware may be implemented as an integrated circuit with custom gate arrays or an application specific integrated circuit ("ASIC"). Of course, the embodiment may also be implemented with discrete hardware components and circuitry.

Figure 6:
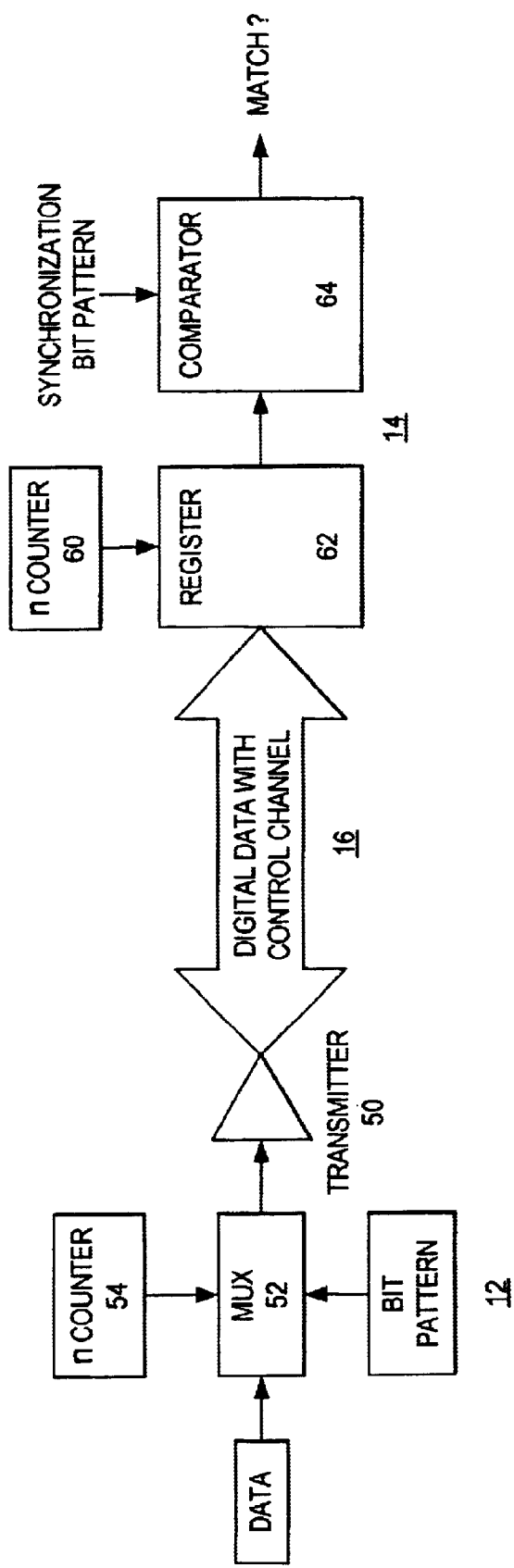
FIG. 6 shows a block diagram illustrating a hardware embodiment of the present invention.

"Referring now to FIG. 6, shown is an illustrative hardware embodiment with a communication device 12 including a buffer containing the data, a desired synchronization bit pattern, a modulo n counter 54, a multiplexer 52 and a transmitter interface 50 to transmit digital data signals over the digital communication channel 16. The buffer is typical for providing a sequence of serial bits, such as a shift resister. The shift register is in communication with the transmitter to provide a sequence of bits. It should be understood that the embodiment of FIG. 6 is an exemplary hardware embodiment primarily for illustrative purposes. There are many other equivalent embodiments and numerous other variations can be applied to this illustrative hardware embodiment. Of course, the invention can also be accomplished in software or firmware executed by a microprocessor as also described herein. The synchronization bit pattern can be held in a buffer containing in part the bit pattern that is transmitted in the control channel of the transmitter digital data stream. The modulo n counter 54 maintains a count to periodically insert the synchronization bit patter into the control channel of the digital data stream. The modulo n counter controls the periodicity of the synchronization bit pattern and control channel. By selecting appropriate values of n, the periodicity or frequency of the control channel, and thus the amount of data capacity overhead consumed by the control channel can be controlled. The counter 54 signals the multiplexer 52 the appropriate interval and frequency to insert the bit pattern in the control channel. At the appropriate interval, the multiplexer 52 inserts the bit pattern to be output by the transmitter interface 52 to the digital communication channel 16. The operation of the components may proceed as described in connection with FIG. 5A."

Across the digital data channel 16, the communication device 14 receiving the data stream from the digital communication channel includes a counter 60, a buffer or register 62, and a comparator 64. Again, the illustrative embodiment is an exemplary hardware embodiment from which there may be many variations. The illustrative embodiment can be embodied in either an originating or answering communication device 14 such as a modem utilizing a digital communication mode such as the ITU-T V.90 "All-Digital" Mode or V.91. The communication device 14 receives the incoming digital signal containing the synchronization bit pattern. The incoming frames of data are monitored and counted by the counter 60. Preferably, the counter 60 is a mod N counter that counts up to N frames of data. On the Nth frame of data, the sign bits of the octets that form the frame are stored in the register 62. In a particular implementation two buffers or registers 62 can be used. The first register receives the digital signal while the counter 60 counts the received frames. The counter 60 is used as a clock signal to clock the appropriate synchronization bits-into the second register where the comparator can operate on the bits. The comparator 64 compares the sign bits of the octets of the Nth frame to the synchronization bit pattern. A failure to match the synchronization bit pattern indicates the loss of synchronization.

An appropriate data recovery procedure can then be implemented, such as the resynchronization of communications and the retransmission of data.

It should be understood that the described components might be embodied in a variety of ways and by different devices. Of course, the components may be realized by logic such as discrete components, combinational logic, exclusive-OR logic gates, shift registers, buffers, and associated hardware well known to those skilled in the art. The hardware may also be embodied as an integrated circuit such as a custom gate array, programmable logic device ("PLD"), application specific integrated circuit ("ASIC") together or apart from a microprocessor with associated RAM and ROM memory. With respect to shift registers, one of ordinary skill in the art would understand them to be, as provided in the Modern Dictionary of Electronics ($7^{th}$ Edition; Rudolf F. Graf; Newnes Publishing): (1) a digital storage circuit in which information is shifted from one flip-flop of a chain to the adjacent flip-flop on application of each clock pulse; data may be shifted several places to the right or left, depending on additional Rating and the number of clock pulses applied to the register; depending on the number of positions shifted, the rightmost characters are lost in a right shift, and the leftmost characters are lost in a left shift; see dynamic shift register and static shift register; (2) a program, entered by the user into the memory of a programmable controller, in which the information data (usually single bits) is shifted one or more positions on a continual basis; there are two types of shift registers: asynchronous and synchronous; (3) a register in which binary data bits are moved as a contiguous group a prescribed number of positions to the right or left; (4) a memory in which data words are entered serially and shifted to successive storage locations; the data word can be read when it has been sequentially shifted to the output; and (5) a digital circuit consisting of flip-flops, which is used to convert parallel data (where several binary digits arrive at once) to serial (where the same digits travel one after another), or vice versa.

Using the embodiments described herein, synchronization problems associated with frame slips can be detected in a digital communication channel. The described embodiments may be utilized between modems having an all-digital communication mode requiring an end-to-end digital communication channel such as the V.90 All-digital mode. The synchronization bit pattern is periodically embedded into the digital data stream using a minimum of overhead bits that could otherwise be used to carry data. The selection of the synchronization pattern is a unique bit pattern that can be distinguished from transmitted data bits. Failure to detect the synchronization pattern quickly indicates a lost of synchronization and a frame slip. Using the described embodiments, the synchronization and frame slips can be determined in a digital communication link to maintain a reliable communication link.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method of transmitting, from a transmitter to a receiver synchronized to the transmitter, synchronization data to detect frame slips in a digital communication channel, the method comprising:

robbing a sign bit of a data octet to cause bandwidth of the digital communication channel, previously allocated to carry data, to be allocated to a control channel of the digital communication channel;

transmitting within the control channel a synchronization bit pattern at periodic intervals to detect frame slips in the digital communication channel, the frame slips indicating a loss of synchronization between the transmitter and the receiver, the synchronization bit pattern being transmitted onto the control channel without corrupting any data.

2. The method of claim 1 wherein the synchronization bit pattern comprises logic 011110.

3. The method of claim 1 wherein the synchronization bit pattern comprises logic 0111011111111010.

4. The method of claim 1 wherein the synchronization bit pattern comprising logic 011110 repeats as necessary.

5. The method of claim 1 wherein the synchronization bit pattern comprises all logic 1s.

6. A transmitter capable of transmitting to a receiver synchronized to the transmitter, a bit pattern to detect a frame slip in a digital communication channel, the transmitter comprising:

a counter for maintaining a count of frames of data comprising a plurality of octets, and identifying a periodic frame;

a buffer for storing the bit pattern; and a multiplexer to insert the bit pattern in the sign bits of x consecutive octets of the frames of data at the periodic frame rate identified by the counter;

wherein x is a positive integer and the bit pattern is transmitted onto a control channel of the digital communication channel to detect the frame slip indicative of a loss of synchronization between the transmitter and the receiver, the control channel being bandwidth of the digital communication channel previously allocated to carry data, now allocated to carry the bit pattern, the bit pattern being transmitted onto the control channel without corrupting any data.

7. The device of claim 6 wherein the buffer stores the sign bits of each octet in the frame.

8. The device of claim 6 wherein the buffer comprises a shift register.

9. The device of claim 6 wherein the counter comprises a 64 mod counter.

10. The device of claim 6 wherein the counter comprises a 1600 mod counter.

11. The device of claim 6 further comprising a transmitter interface to transmit the bit pattern onto the digital communication channel.

12. A first communication device sending to a second communication device synchronized to the first communication device, a synchronization bit pattern to detect a frame slip in a digital communication channel, the first communication device comprising:

a transmitter transmitting a control channel over the digital communication channel, wherein the control channel is bandwidth of the digital communication channel previously allocated to carry data, now allocated to carry the synchronization bit pattern within sign bits of x consecutive octets of data over the digital communication channel, the synchronization bit pattern is used for detecting the frame slip indicative of a loss of synchronization between the first communication device and the second other communication device, and x is a positive integer, the synchronization bit pattern being transmitted onto the control channel without corrupting any data;

a multiplexer in communication with the transmitter, the multiplexer providing the transmitter with a sequence of bits;

a buffer in communication with the multiplexer, wherein the buffer periodically supplies multiplexer with the synchronization bit pattern; and a counter in communication with the buffer for periodically triggering the synchronization bit pattern to the multiplexer.

13. The device of claim 12 wherein the buffer stores the sign bits of an octet in the frame of data.

14. The device of claim 12 wherein the counter comprises a 64 mod counter.

15. The device of claim 12 wherein the counter comprises a 1600 mod counter.

16. A method of transmitting, from a transmitter to a receiver synchronized to the transmitter, synchronization data to detect a frame slip in a digital communication channel, the method comprising:

robbing a sign bit of a data octet to cause bandwidth of the digital communication channel, previously allocated to carry data, to be allocated to a control channel transmitted through the digital communication channel, wherein the control channel comprises the sign bit of a plurality of octets carrying a synchronization bit pattern;

transmitting within the control channel the synchronization bit pattern at periodic intervals, the synchronization bit pattern being transmitted onto the control channel without corrupting any data;

monitoring the control channel carrying the synchronization bit pattern;

comparing a bit pattern of the control channel to the synchronization bit pattern;

wherein the failure to match the bit pattern to the synchronization bit pattern indicates the frame slip indicative of a loss of synchronization between the transmitter and the receiver.

17. The method of claim 16 wherein the synchronization bit comprises logic 011110.

18. The method of claim 16 wherein the synchronization bit pattern comprises logic 0111011111111010.

19. The method of claim 16 wherein the synchronization bit pattern comprising logic 011110 repeats as necessary.

20. The method of claim 16 wherein the synchronization bit pattern comprises all logic 1s.

21. The method of claim 16 wherein the step of robbing the sign bit comprises robbing the sign bits of x consecutive octets of data forming a frame, wherein x comprises a positive integer.

22. The method of claim 21 wherein x is equal to 6.

23. The method of claim 21 wherein the step of robbing the sign bit comprises robbing the sign bits of the x octets of every N data frames, wherein N comprises a positive integer.

24. The method of claim 23 wherein N is equal to 64.

25. The method of claim 23 wherein N is equal to 1600.

26. The method of claim 16 wherein the step of monitoring further comprises: counting N frames of data octets, wherein a frame comprises a plurality of x octets, and x and N comprise positive integers; and reading the x sign bits of the octets of the Nth frame.

27. The method of claim 26 wherein x is equal to 6 and N is equal to 64.

28. The method of claim 26 wherein x is equal to 6 and N is equal to 1600.

29. The method of claim 26 wherein sign bits form the synchronization bit pattern comprising 011110.

30. The method of claim 26 wherein sign bits form the synchronization bit pattern comprising 111111.

31. A computer readable medium having store therein instructions for causing a central processing unit to execute the method of claim 16.

* * * * *